(No Model.)
J. R. CALHOUN.
WAGON BOLSTER SPRING.
No. 299,518. Patented June 3, 1884.
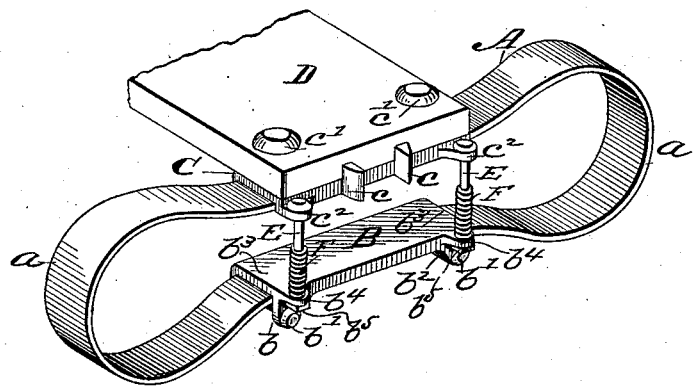
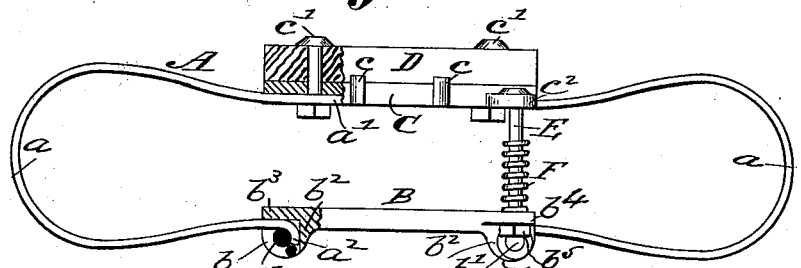
Attest,
J. W. Hoke
C. D. Biser
Inventor,
John R. Calhoun
by C. D. Moody, atty

UNITED STATES PATENT OFFICE.

JOHN R. CALHOUN, OF ST. LOUIS, MISSOURI.

WAGON-BOLSTER SPRING.

SPECIFICATION forming part of Letters Patent No. 299,518, dated June 3, 1884.

Application filed July 16, 1883. (No model.)

*To all whom it may concern:*

Be it known that I, JOHN R. CALHOUN, of St. Louis, Missouri, have made a new and useful Improvement in Wagon-Bolster Springs, of which the following is a full, clear, and exact description, reference being had to the annexed drawings, making part of this specification, in which—

Figure 1 is a view in perspective of the improved spring. The view also shows the end of the wagon-box support attached to the springs. Fig. 2 is a view in perspective showing detached from each other the saddle that rests upon the bolster, the spring which connects with the saddle, and the plate which rests upon the spring; and Fig. 3, a side elevation, partly in section, of the spring and bed-support.

The same letters of reference denote the same parts.

The invention relates to the construction of the spring proper, to the mode of connecting it with the bolster-saddle, to the plate attached to the top of the spring, and to the means for preventing the spring from opening too far from the saddle.

The spring proper, A, is shown more distinctly in Fig. 2. It consists of a single piece of metal whose end portions, $a\ a$, are curved downward and inward beneath the central portion, $a'$, of the spring, substantially as shown, and the extremities of the portions $a\ a$ are crimped to form the hook-shaped lips $a^2\ a^2$. The top or central portion, $a'$, is, as seen, substantially flattened.

B represents the bolster-saddle. It is suited to rest upon the wagon-bolster. At its ends it is provided with the ears $b\ b$, through which a bar or bolt, $b'$, is passed. The spring A is readily attached to the saddle by hooking the lips $a^2\ a^2$ over the bars $b'\ b'$, respectively. The parts $b^2\ b^2$ of the saddle prevent the spring ends from moving inward from the bars $b'\ b'$, and the parts $b^3\ b^3$ prevent them from being accidentally lifted off from the bars. The spring can thus be very readily made, and be readily and securely jointed to the saddle.

The plate C is substantially a flat plate fastened to the central portion, $a'$, of the spring. It may have the lugs $c\ c$, to admit the bolster-standard. The wagon-bed support D rests upon the plate C, and the bolts $c'\ c'$ serve to unite the spring, plate, and support. The plate C is also supplied with the lugs $c^2\ c^2$, to receive the bolts E E, which, as seen more distinctly in Fig. 3, serve to tie the upper and lower parts of the spring together, so that the spring in its action shall not open too far from the saddle. For this purpose the lower ends of the bolts E E pass through lugs $b^4\ b^4$ upon the saddle B. When the spring is compressed, the lower ends of the bolts slip through the lugs $b^4\ b^4$; but the nuts $b^5\ b^5$ prevent the upper part of the spring from rising above the limit fixed. The springs F F may be attached to the bolts E E, as shown, to sustain the central portion of the spring when compressed. The plate C preferably has flanges $c^3\ c^3$, to come against the side edges of the spring, and thereby hold the plate more securely in place upon the spring. It is not necessary to extend the lugs $c\ c$ above the level of the main part $c^4$ of the plate C. The central portion, $a'$, of the spring A is preferably somewhat depressed below the level of the ends of the spring.

I am aware that wagon-springs have been made of a single bowed piece with the ends curved toward each other, and attached to a shackle fixed to the bolster, the cross-board being secured directly to the top of the spring.

I am also aware that it is not new to construct a spring of two bowed pieces secured to a wagon-bed support, and also attached to a yoke which is on the bolster. I do not therefore broadly claim such devices as my invention.

I claim—

1. The combination of the spring A, the saddle B, the plate C, and the bolts E E, substantially as described.

2. The combination of the spring A, made of one piece, bowed at $a\ a$, as described, the saddle B, having ears formed on it, the plate C, having side flanges to receive the edges of the spring A, and the bolts E, substantially as specified.

3. The combination of the single spring A, bowed at $a\ a$, the saddle B, the plate C, having flanges on its sides, the bolts E, and the spring F, and the wagon-bed support D, substantially as described.

4. The spring A, formed in one piece flattened on top at or near its mid-length, having bow $a\ a$ and crooked ends $a^2$, combined with the plate C and the saddle B, substantially as described.

Witness my hand this 28th day of June, 1883.

JOHN R. CALHOUN.

Witnesses:
C. D. MOODY,
SOLON N. SAPP.